US 6,721,125 B2

(12) United States Patent
Bryant

(10) Patent No.: US 6,721,125 B2
(45) Date of Patent: Apr. 13, 2004

(54) POSITION SENSING SYSTEM FOR DISC DRIVE MAGNETIC MICROACTUATORS

(75) Inventor: Lawrence Matthias Bryant, Palo Alto, CA (US)

(73) Assignee: Seagate Technology LLC, Scotts Valley, CA (US)

(*) Notice: Subject to any disclaimer, the term of this patent is extended or adjusted under 35 U.S.C. 154(b) by 348 days.

(21) Appl. No.: 09/892,116

(22) Filed: Jun. 26, 2001

(65) Prior Publication Data

US 2002/0021525 A1 Feb. 21, 2002

Related U.S. Application Data

(60) Provisional application No. 60/225,258, filed on Aug. 15, 2000.

(51) Int. Cl.$^7$ .............................................. G11B 5/596
(52) U.S. Cl. ................................. 360/78.05; 360/78.12
(58) Field of Search ........................... 360/78.05, 78.12

(56) References Cited

U.S. PATENT DOCUMENTS

| | | | |
|---|---|---|---|
| 5,060,210 A | * 10/1991 | Fennema et al. | 369/32 |
| 5,898,541 A | 4/1999 | Boutaghou et al. | 360/109 |
| 5,943,189 A | 8/1999 | Boutaghou et al. | 360/103 |
| 5,998,906 A | 12/1999 | Jerman et al. | 310/309 |
| 6,002,549 A | 12/1999 | Berman et al. | 360/104 |
| 6,052,251 A | 4/2000 | Mohajerani et al. | 360/78.05 |
| 6,067,215 A | 5/2000 | Zhang | 360/260 |
| 6,069,771 A | 5/2000 | Boutaghou et al. | 360/104 |
| 6,078,473 A | 6/2000 | Crane et al. | 360/104 |
| 6,108,175 A | 8/2000 | Hawwa et al. | 360/294.2 |
| 6,115,223 A | 9/2000 | Berg et al. | 360/294.4 |
| 6,122,149 A | 9/2000 | Zhang et al. | 360/294.5 |

* cited by examiner

Primary Examiner—David Hudspeth
Assistant Examiner—Mitchell Slavitt
(74) Attorney, Agent, or Firm—Merchant & Gould P.C.

(57) ABSTRACT

An apparatus and method for sensing the position of a read/write head or transducer carried by a microactuator at a distal end of a primary actuator in a head disc assembly of a disc drive. The position sensing system has a fixed member attached to the primary actuator and a moveable member attached to the fixed member by an attachment device. The attachment device permits the moveable member to move in relation to the fixed member along a predetermined pathway. A secondary voice coil motor (VCM) drives the movement of the microactuator via a VCM coil that is affixed to the moveable member, wherein a high frequency signal is applied to the VCM coil. At least one sense coil is attached to the fixed member and positioned near the VCM coil, such that the sense coil will receive a portion of the high frequency signal transmitted from the VCM coil through mutual magnetic coupling. The magnitude of magnetic coupling at the sense coil will provide a position measurement of the VCM coil of the microactuator, and thus the transducer, relative to the primary actuator.

20 Claims, 3 Drawing Sheets

POSITION SENSING SYSTEM FOR DISC DRIVE MAGNETIC MICROACTUATORS

RELATED APPLICATIONS

This application claims priority of U.S. provisional application Serial No. 60/225,258, filed Aug. 15, 2000.

FIELD OF THE INVENTION

This application relates generally to disc drives and more particularly to a method and apparatus for sensing the position of a magnetically driven microactuator in a disc drive.

BACKGROUND OF THE INVENTION

Disc drives are data storage devices that store digital data in magnetic form on a rotating storage medium, such as a disc. Modern disc drives comprise one or more discs that are coated with a magnetizable medium and mounted on the hub of a drive motor for rotation at a constant high speed. Information is stored on the discs in a plurality of concentric circular tracks typically by an array of transducers ("heads") mounted to a radial actuator for movement of the heads relative to the discs. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment.

Typically, such actuators employ a voice coil motor to position the heads with respect to the disc surfaces. The actuator voice coil motor includes a coil mounted on the side of the actuator arm opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

The density of concentric data tracks on magnetic discs continues to increase (that is, the radial spacing between data tracks is decreasing), requiring more precise radial positioning of the head. Conventionally, head positioning was accomplished by operating the actuator arm with a large-scale voice coil motor to radially position a head on a flexure at the end of the actuator arm. The head position sensing was achieved by providing the hard disc drive with a servo system that read servo information from the discs and continually repositioned the locations of the transducer heads with respect to the data tracks on the discs.

However, this conventional large-scale actuator motor lacks sufficient resolution to effectively accommodate high track-density discs. Thus, a high-resolution head positioning mechanism, or microactuator, is necessary to accommodate the more densely spaced tracks. These microactuators or secondary actuators enable increased precision for the position servo systems that are used to stay on data tracks with ever increasing track pitch densities. Various microactuator locations and designs have been considered to achieve high resolution head positioning and may operate by a magnetic force, an electrostatic force, or mechanical piezoelectric effect. The microactuators that use magnetic force consist of essentially miniaturized versions of similar magnetic voice coil motors presently used for the larger primary actuators.

However, neither the larger primary actuator nor the magnetic microactuator possess any means of determining their absolute position with respect to each other. Further, when both the primary actuator and the microactuator use magnetic force motors, both motors create motion by applying force or acceleration to the movable portion of the actuators. The position of either actuator therefore represents a mathematical double integration of the applied acceleration. In this case, very small imbalances and offsets will cause one of the actuators to eventually move to the extreme end of its range of motion. This, in turn, will result in failure of any control system to adequately position the actuators.

It is thus desirable to provide a position sensing system which will determine the position of a magnetic microactuator relative to the position of the primary actuator.

SUMMARY OF THE INVENTION

Against this backdrop the present invention has been developed for sensing and measuring the position of a transducer attached to a magnetically driven actuator, such as a microactuator, relative to a primary actuator in a head disc assembly.

The head disc assembly in a disc drive has a base plate and a top cover that encloses a drive motor, a disc supported thereon, and a primary actuator assembly. A microactuator carries a read/write head or transducer at a distal end of the primary actuator assembly. The primary actuator assembly provides course or large scale positioning of the transducer over the disc while the microactuator provides fine or small scale positioning of the transducer. The microactuator utilizes a secondary voice coil motor ("VCM") with a coil to adjust the fine position of the transducer.

The position sensing system in accordance with the present invention measures the position of the secondary VCM coil of the microactuator and thus measures the position of the transducer. The position sensing system has a fixed member attached to the primary actuator and a moveable member attached to the fixed member by an attachment device. The attachment device permits the moveable member to move in relation to the fixed member along a predetermined pathway. The secondary VCM coil of the microactuator is fastened to the moveable member. A high frequency signal is applied to this secondary VCM coil. At least one sense coil is attached to the fixed member and positioned near the secondary VCM coil, such that the sense coil will receive a portion of the high frequency signal transmitted from the VCM coil through mutual magnetic coupling. The magnitude of the signal received by the sense coil is inversely proportional to the distance between the coils.

These and various other features as well as advantages which characterize the present invention will be apparent from a reading of the following detailed description and a review of the associated drawings.

DETAILED DESCRIPTION

Figure 1:
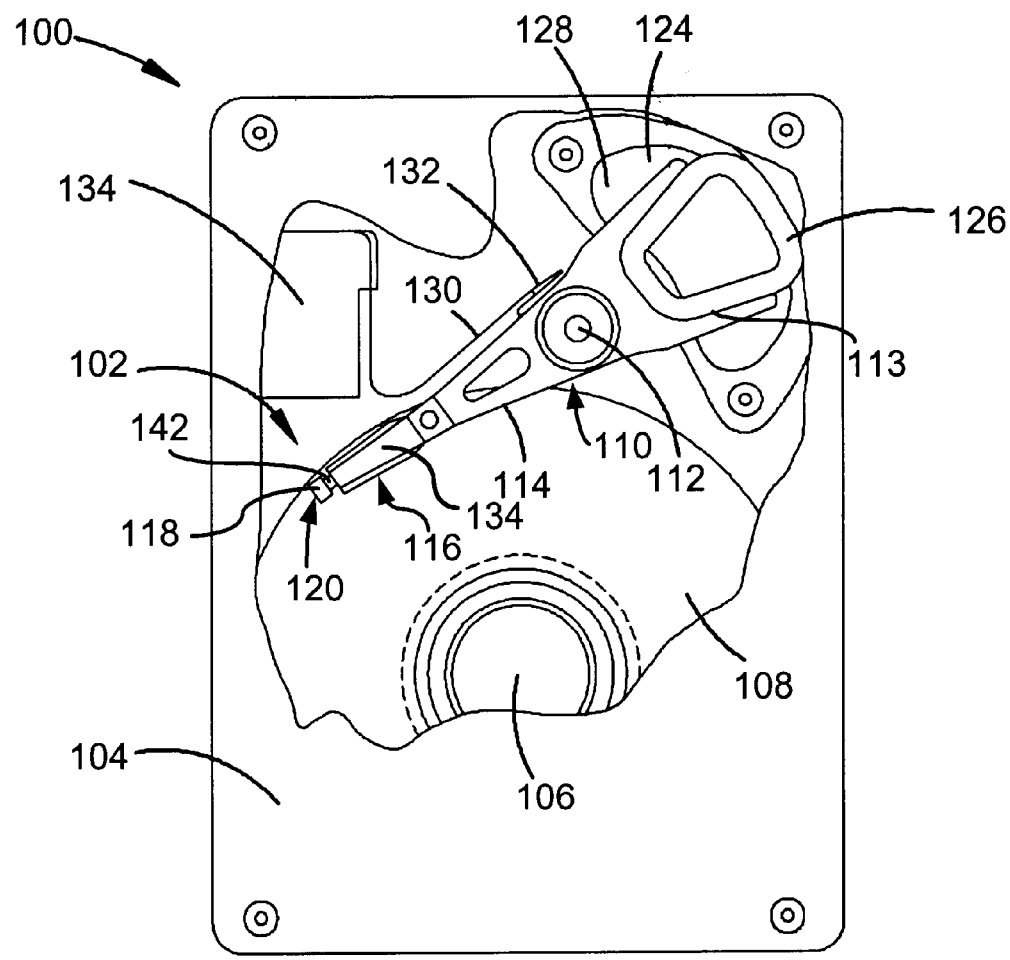
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a metal base plate 102 to which various components of the disc drive 100 are mounted. The top cover 104 cooperates with the base plate 102 to form an internal, sealed environment for the disc drive components in a conventional manner. The components include a drive motor 106 which rotates the discs 108 at a constant high speed. Information is written to and read from tracks on each of the discs 108 through the use of an primary actuator assembly 110, which rotates about a bearing shaft assembly 112 positioned adjacent the discs 108. The primary actuator assembly 110 includes an actuator body 113, or E-Block, having one or more primary actuator arms 114, which extend towards the discs 108, with one or more flexures 116 extending from each primary actuator arm 114. Mounted at an end of each of the flexures 116 opposite the primary actuator arm 114 is a head slider 120 including one or more read and/or write heads 118. The slider 120 enables the heads 118 to fly in close proximity (or at a "flying height") above the corresponding surface of the associated disc 108. The flying height is a height at which the heads can read from and write data onto a disc while not touching the disc surface.

The course radial position of the slider 120 and its heads 118 is controlled through the use of a primary voice coil motor (VCM) 124. The primary VCM 124 typically includes a coil 126 attached to the primary actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the primary actuator assembly 110 pivots about the bearing shaft assembly 112 and the heads 118 are caused to move across the surfaces of the discs 108.

Each of the flexures 116 includes a load beam 134 and a gimbal insert 142. The load beam 134 has a distal end 136 positioned near the slider 120 and an opposite end (not shown) which is attached to the primary actuator arm 114. The gimbal insert 142 is connected to the distal end 136 of the load beam 134. A movable member, such as the slider 120, is attached to a fixed member, such as the gimbal insert 142, by an attachment means such as one or more pivot bearings, sliding bearings, flexible members, or other suspension means not shown. The slider 120 is constrained by the attachment means to move along a predetermined path, such as a linear path with respect to the fixed gimbal insert 142 as illustrated by the double headed arrow between point A and point B in FIG. 2. The slider 120 may also be constrained by the attachment means to move along a semicircular path or some other path shape if desired. Alternatively, the attachment means may allow the moveable member, such as the slider 120, to rotate with respect to the fixed member, such as the gimbal insert 142. Although the fixed member is considered fixed in relation to the moveable member, it may be movable in relation to other disc drive components, such as the larger primary actuator 110.

Figure 2:
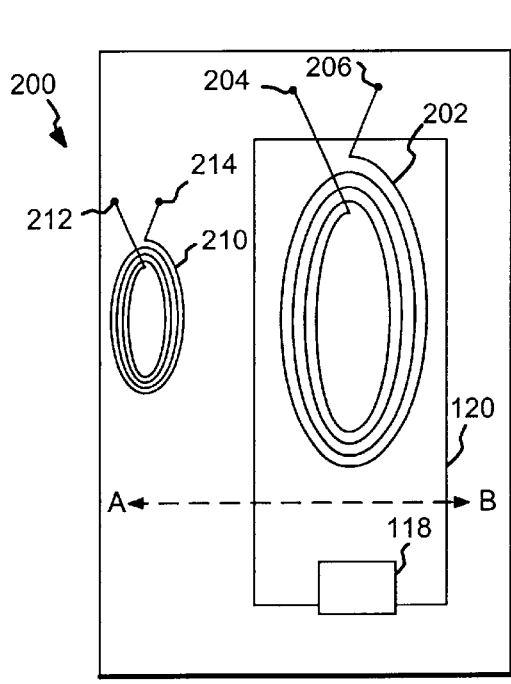
FIG. 2 is a schematic representation of the sensing system wherein the slider is positioned at one extreme end of its range of motion in accordance with a preferred embodiment of the present invention.
Figure 3:
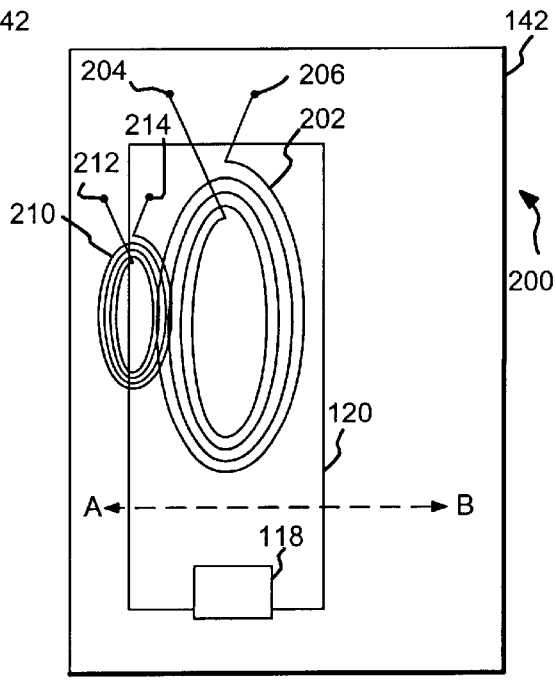
FIG. 3 is a schematic representation of the sensing system of FIG. 2 wherein the slider is positioned at the other extreme end of its range of motion.

FIGS. 2 and 3 substantially illustrate a position sensing system 200 in accordance with one preferred embodiment of the present invention. A magnetic microactuator (not shown) is attached to a movable member, such as the slider 120, in relation to the fixed gimbal insert 142. The microactuator includes a secondary voice coil motor ("VCM") (not shown) with a secondary VCM coil 202 having terminals 204 and 206. Although FIGS. 2 and 3 represent the VCM coil 202 as an elliptical coil with a flat structure, the coil 202 is not limited to this shape. Instead, the coil 202 may be of any size or shape so long as it is operable in a voice coil motor.

A high frequency signal is applied to the VCM coil 202 via the terminals 204 and 206. This high frequency signal is chosen to be high enough in frequency that it does not cause the secondary VCM to move the slider 120 and low enough in frequency that it is not coupled into the read and write signals going to or coming from the read/write head 118. Preferably, this frequency has a lower limit of 100–200 kilohertz and an upper limit on the order of a few tens of megahertz.

The position sensing system 200 includes a first sense coil 210 that is placed within the magnetic fringe field of the VCM coil 202. The high frequency signal applied to the VCM coil 202 will appear at the terminals 212 and 214 of the first sense coil 210 by mutual magnetic coupling from the VCM coil 202. When the slider 120 and the VCM coil 202 are relatively far away from the first sense coil 210, as shown in FIG. 2, this mutual coupling will be small and the magnitude of the resulting high frequency signal appearing at the terminals 212 and 214 will be small. When the slider 120 and the VCM coil 202 move relatively close to or overlap the first sense coil 210, as shown in FIG. 3, this mutual coupling will be large and the magnitude of the resulting high frequency signal appearing at the terminals 212 and 214 will be large. The first sense coil 210 may be affixed to a structure above or below the VCM coil 202 on the gimbal insert 142 so that the VCM coil 202 may move to a position which overlaps all or part of the first sense coil 210. As the position of the VCM coil 202, and thus the slider 120 and the head 118, moves relative to the gimbal insert 142, the position sensing system 200 will detect the amplitude of the mutually coupled signal appearing at the sense coil terminals 212 and 214. In this way, the position of the microactuator may be measured relative to the primary actuator 110 which will precisely pinpoint the exact position of the read/write head 118.

Figure 4:
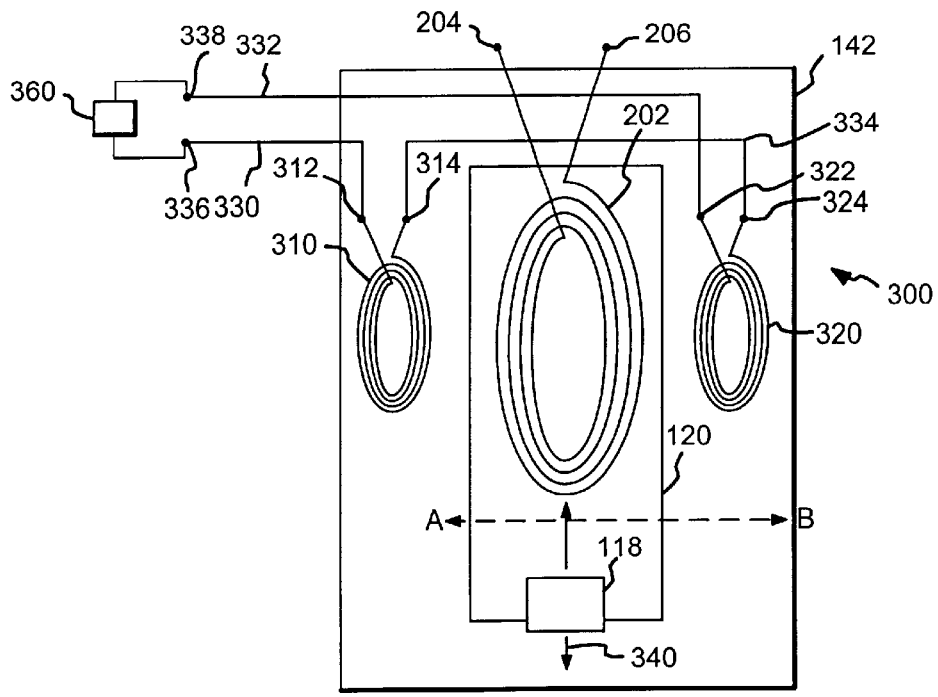
FIG. 4 is a schematic representation of a sensing system in accordance with a second preferred embodiment of the present invention.

FIG. 4 schematically illustrates a position sensing system 300 in accordance with a second preferred embodiment of the present invention. The sensing system 300 includes a first sense coil 310 and a second sense coil 320 that is attached to the gimbal insert 142 and positioned on an opposite side of the VCM coil 202 from the first sense coil 310. The first sense coil 310 terminates at the terminals 312 and 314 and the second sense coil 320 terminates at terminals 322 and 324. Similar to the first sense coil 210 of the first embodiment, the high frequency signal applied to VCM coil 202 will appear at the terminals 312 and 314 of the first sense coil 310 and at the terminals 322 and 324 of second sense coil 220 by mutual magnetic coupling from the VCM coil 202. As the slider 120 moves from toward point B, the mutually coupled high frequency signal sensed at the terminals 312 and 314 of first sense coil 310 will decrease and will increase at terminals 322 and 324 of second sense coil 320. Conversely, as the slider 120 moves towards point A, the mutually coupled high frequency signal sensed will increase at terminals 312 and 314 of the first sense coil 310 and will decrease at terminals 322 and 324 of the second sense coil 320.

The two sense coils 310 and 312 may be wired in a series connection by wires 330, 332, and 334 as shown in FIG. 4 in which an opposite polarity relationship exists with regard to the mutually coupled high frequency signal. The wire 334 connects terminal 324 of the second sense coil 320 to terminal 314 of the first sense coil 310. The wires 330 and 332 connect terminals 312 and 322 to terminals 336 and 338, respectively. The signal from the first sense coil 310 will substantially cancel the signal from the second sense coil 320 when slider 120 is halfway between the sense coils 310 and 312 when the two sense coils 310 and 312 are connected in this manner. This configuration is advantageous because a zero signal or null point 340 is achieved at the middle position of the movable microactuator which occurs at the midpoint between points A and B. Additionally, with the reversed polarity series connection described, the polarity of the mutually coupled high frequency signal will reverse as the slider 120 crosses the null point 340 from one side to the other. Additionally, an electronic detection circuit 360 may be added to the series connection that will detect this polarity change, thereby creating an effective directionally sensitive position sensing system 300. In this way, the position sensing system 300 will determine the position of microactuator as compared to the primary actuator 110 thereby providing the precise position measurement of the head 118.

In the schematic illustrations of FIGS. 2–4, the sense coils 210, 220, 310, and 320 are shown in a planar relationship to VCM coil 202. However, one or both of the sense coils 210 and 220 or 310 and 320 may be rotated around an arbitrary axis to arrive at some other geometric configuration and magnetic coupling relationship to VCM coil 202 without disturbing the essential function of this invention. For instance, the first sense coil 210 or 310 and the second sense coil 220 or 320 may be mounted against a sidewall of the gimbal insert 142 and thereby reside in a 180° relationship to VCM coil 202. In this case, the sense coils 210, 220, 310, and 320 must be placed such that there is sufficient mutual magnetic coupling with VCM coil 202 to at least one side of each the sense coils 210, 220, 310, and 320. Further, FIGS. 2–4 show the sense coils 210, 220, 310, and 320 as being smaller than the VCM coil 202. However, the sense coils 210, 220, 310, and 320 may be of any size, including larger than, smaller than, or equal to the size of the VCM coil 202.

Figure 5:
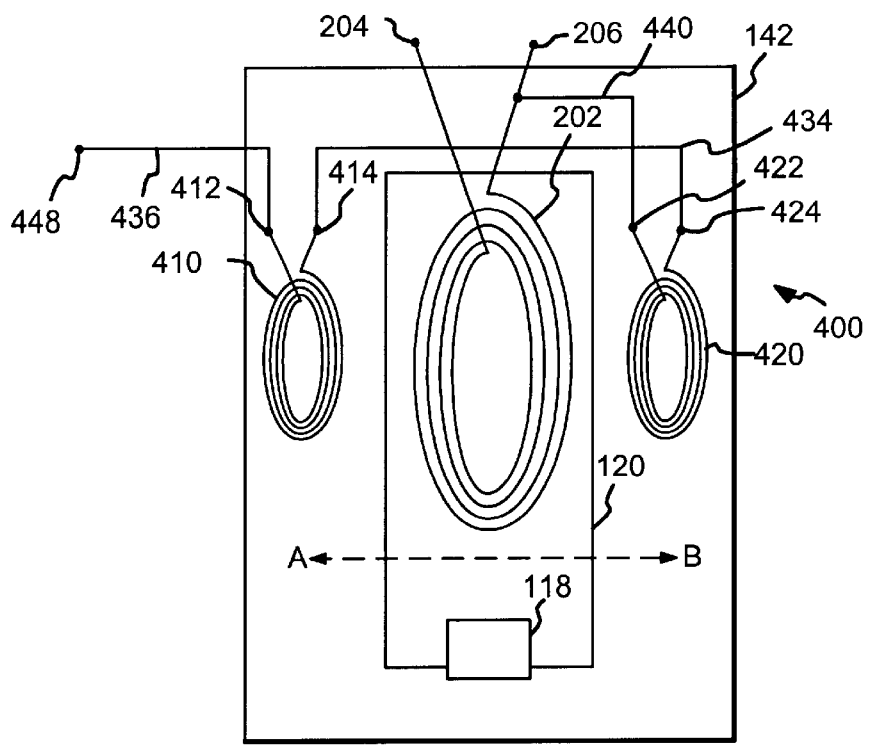
FIG. 5 is a schematic representation of a sensing system in accordance with a third preferred embodiment of the present invention.

FIG. 5 illustrates a position sensing system 400 in accordance with a third preferred embodiment of the present invention. The sensing system 400 includes a first sense coil 410 and a second sense coil 420 that are attached to the gimbal insert 142 on opposite sides of the VCM coil 202. The first sense coil 410 terminates at terminals 412 and 414 and the second sense coil 420 terminates at terminals 422 and 424. Similar to the first two embodiments, the high frequency signal applied to VCM coil 202 coupled to the first sense coil 410 will appear at terminals 412 and 414 and coupled to the second sense coil 420 will appear at the terminals 422 and 424 by mutual magnetic coupling from VCM coil 202. A wire 434 connects the terminal 424 of the second sense coil 420 to the terminal 414 of the first sense coil 410. A wire 436 connects the terminal 412 of the first sense coil 410 to a terminal 448. Instead of having a wire 332 attached to the terminal 336 as shown in FIG. 4, a wire 440 is connected to the terminal 422 of the second sense coil 420 and the terminal 206 of the VCM coil 202 in order to reduce the number of external electrical connections required for the sensing system 400 to sense the position of the slider 120.

Figure 6:
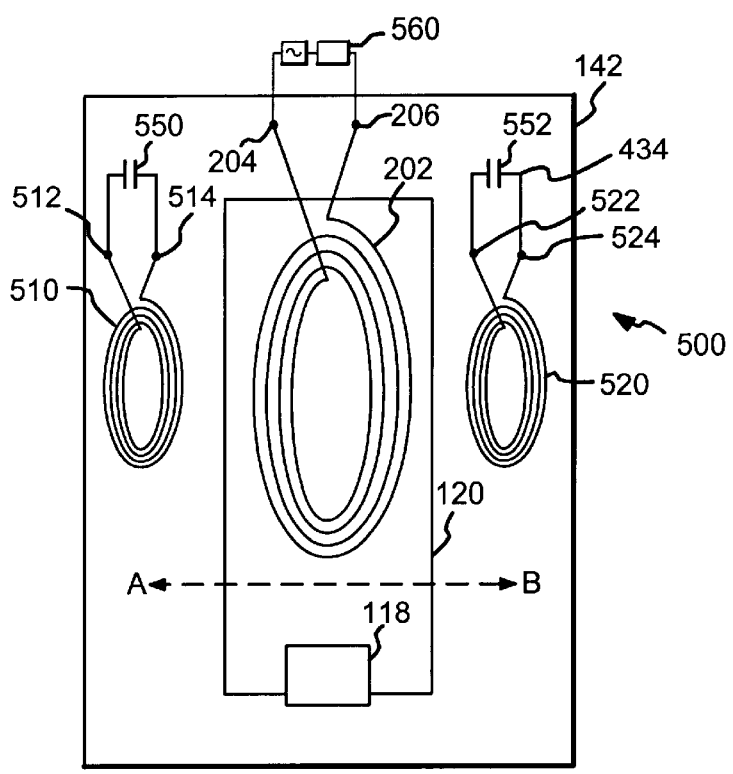
FIG. 6 is a schematic representation of a sensing system in accordance with a fourth preferred embodiment of the present invention.

FIG. 6 illustrates a position sensing system 500 in accordance with yet another preferred embodiment of the present invention. The sensing system 500 includes a first sense coil 510 and a second sense coil 520 that are attached to the gimbal insert 142 on opposite sides of the VCM coil 202. The first sense coil 510 has terminals 512 and 514 and the second sense coil 520 has terminals 522 and 524. Instead of having terminals 236 and 238 as shown in FIG. 4, a pair of capacitors 550 and 552 are connected to the terminals 512 and 514 of the first sense coil 510 and terminals 522 and 524 of the second sense coil 520, respectively, thereby establishing a closed circuit for high frequency signals for each of the sense coils 510 and 520. An impedance sensing means 560 may be connected to the VCM coil 202 to measure the mutual coupling to one or more of the sense coils 510 and 520 thereby providing a position measurement of the slider 120 and associated head 118 without any additional wires being required. Alternatively, this embodiment may use just one sense coil. Further, the capacitor 550 may have a different capacitance value than the capacitor 552 thereby establishing different frequency sensitivities for each of the two sense coils 510 and 520. The capacitors 550 and 552 may also be chosen to take advantage of the inductor-capacitor resonant circuit created by such connection. Two differing resonant frequencies can thereby be established to aid in determination of the distance that secondary coil 510 resides from each of the sense coils 510 and 520.

In summary, the present invention preferably is a position sensing system (such as 200, 300, 400, and 500) for sensing the position of the transducer (such as 120) carried by the microactuator at the distal end of the primary actuator (such as 110) within a head disc assembly in a disc drive (such as 100). The position sensing system (such as 200, 300, 400, and 500) has a fixed member (such as 142) attached to the primary actuator (such as 110) and a moveable member (such as 120) attached to the fixed member (such as 142) by an attachment device. The attachment device permits the moveable member (such as 120) to move in relation to the fixed member (such as 142) along a predetermined pathway (such as A to B). The voice coil motor coil (such as 202) of the microactuator is affixed to the moveable member (such as 120). The voice coil motor coil (such as 202) has a pair of terminals (such as 204 and 206) at its opposite ends for receiving a high frequency signal applied to the voice coil motor coil (such as 202). A sense coil (such as 210, 310, 410, and 510) is attached to the fixed member (such as 142) and positioned near the voice coil motor coil (such as 202) to receive a portion of the high frequency signal from the voice coil motor coil (such as 202) through mutual magnetic coupling. The fixed member (such as 142) may be the gimbal insert (such as 142) and the moveable member (such as 120) may be the slider (such as 120). A second sense coil (such as 220, 320, 420, and 520) may be attached to the fixed member (such as 142) on an opposite side of the voice coil motor coil (such as 202) from the first sense coil (such as 210, 310, 410, and 510). In this way, the second sense coil (such as 220, 320, 420, and 520) will receive another portion of the high frequency signal from the voice coil motor coil (such as 202) through mutual magnetic coupling.

Additionally, two or three wires (such as 330, 332, 334, 434, 436, and 440) may be included for wiring a pair of terminals (such as 212, 214, 312, 314, 412, 414, 512, and 514) of the first sense coil (such as 210, 310, 410, and 510) and a pair of terminals (such as 222, 224, 322, 324, 422, 424, 522, and 524) of the second sense coil (such as 220, 320, 420, and 520) in a series connection and in an opposite polarity relationship to each other with regard to the mutually coupled high frequency signal of the VCM coil (such as 202). An electronic detection circuit (such as 360) may be attached to the series connection for detecting the polarity change between the first and second sense coils (such as 210, 220, 310, 320, 410, 420, 510, and 520). A first capacitor (such as 550) may be connected to a pair of terminals (such as 212, 214, 312, 314, 412, 414, 512, and 514) of the first sense coil (such as 210, 310, 410, and 510) and a second capacitor (such as 552) may be connected to a pair of terminals (such as 222, 224, 322, 324, 422, 424, 522, and 524) of the second sense coil (such as 220, 320, 420, and 520) thereby establishing a closed circuit for the high frequency signal for each of the sense coils (such as 210, 220, 310, 320, 410, 420, 510, and 520). Further, an impedance sensing device (such as 560) may be connected to the VCM coil (such as 202) for measuring the mutual coupling to the first and second sense coils (such as 210, 220, 310, 320, 410, 420, 510, and 520).

In the method, the fixed member (such as 142) attached to the primary actuator (such as 110) is provided and the moveable member (such as 120) attached to the fixed member (such as 142) is provided whereby the moveable member (such as 120) may move in relation to the fixed member (such as 142) in response to current through the VCM coil (such as 202) fastened to the moveable member (such as 120). The high frequency signal is applied to the VCM coil (such as 202) via a pair of terminals (such as 204 and 206) at opposite ends of the VCM coil (such as 360). The first sense coil (such as 210, 310, 410, and 510) is positioned on the fixed member (such as 142) near the VCM coil (such as 202) such that the first sense coil (such as 210, 310, 410, and 510) can receive a portion of the high frequency signal by mutual magnetic coupling. And the portion of the high frequency signal coupled into the first sense coil (such as 210, 310, 410, and 510) is measured. The second sense coil (such as 220, 320, 420, and 520) may be positioned on the fixed member (such as 142) near the VCM coil (such as 202) but on an opposite side of the VCM coil (such as 202) from the first sense coil (such as 210, 310, 410, and 510) such that the second sense coil (such as 220, 320, 420, and 520) can receive a portion of the high frequency signal by mutual magnetic coupling. The first sense coil (such as 210, 310, 410, and 510) and the second sense coil (such as 220, 320, 420, and 520) may be connected in series connection to provide an opposite polarity relationship between the coils (such as 210, 220, 310, 320, 410, 420, 510, and 520) with regard to the mutually coupled high frequency signal from the VCM coil (such as 202). A polarity change may be detected between the first and second coils (such as 210, 220, 310, 320, 410, 420, 510, and 520) with an electronic detection circuit (such as 360) attached to the series connection between the first and second sense coils (such as 210, 220, 310, 320, 410, 420, 510, and 520). A closed circuit may be established for the high frequency signal sensed by the first and second sense coils (such as 210, 220, 310, 320, 410, 420, 510, and 520) with a first capacitor (such as 550) connected across the first sense coil (such as 210, 310, 410, and 510) and a second capacitor (such as 552) connected across of the second sense coil (such as 220, 320, 420, and 520). Finally, the mutual coupling of the first and second sense coils (such as 210, 220, 310, 320, 410, 420, 510, and 520) may be measured with an impedance sensing device (such as 560) connected to the VCM coil (such as 202).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the microactuator and secondary voice coil motor do not need to be attached to the slider, as long as the sensing means is attached to a fixed member in relation to the secondary voice coil motor. So for example, the microactuator could be attached to a movable gimbal insert with the sensing means being attached to a fixed load beam. Or the microactuator could be attached to a moveable read/write head with the sensing means being attached to a fixed slider. Numerous other changes may be made which will readily suggest themselves to those skilled in the art and which are encompassed in the spirit of the invention disclosed and as defined in the appended claims.

What is claimed is:

1. A position sensing system for sensing a position of a transducer carried by a microactuator at a distal end of a primary actuator, the microactuator having a voice coil motor coil, the position sensing system comprising:
    a fixed member attached to the primary actuator;
    a moveable member attached to the fixed member by an attachment device which permits the moveable member to move in relation to the fixed member along a predetermined pathway wherein voice coil motor coil is affixed to the moveable member;
    a pair of terminals at opposite ends of the voice coil motor coil for receiving a high frequency signal applied to the voice coil motor coil; and
    a sense coil attached to the fixed member and positioned near enough to the voice coil motor coil to receive a measurable portion of the high frequency signal transmitted from the voice coil motor coil through mutual magnetic coupling.

2. The position sensing system of claim 1 wherein:
    the fixed member is a gimbal insert and the moveable member is a slider.

3. The position sensing system of claim 1 further comprising:
    a second sense coil attached to the fixed member on an opposite side of the voice coil motor coil from the first sense coil, the second sense coil receiving another portion of the high frequency signal from the voice coil motor coil through mutual magnetic coupling.

4. The position sensing system of claim 3 further comprising:
    a first wire connecting one terminal of the first sense coil to one terminal of the second sense coil, a second wire connecting to another terminal of the first sense coil, and a third wire connecting to another terminal of the second sense coil, wherein the first and second coils are connected in a series connection and in an opposite polarity relationship to each other with regard to the mutually coupled high frequency signal of the VCM coil.

5. The position sensing system of claim 4 further comprising:
    an electronic detection circuit connected to the first and third wires for detecting a polarity change between the first and second sense coils.

6. The position sensing system of claim 3 further comprising:
   two wires for connecting terminals of the first sense coil and terminals of the second sense coil in a series connection with the first and second sense coils in an opposite polarity relationship to each other with regard to the mutually coupled high frequency signal of the VCM coil.

7. The position sensing system of claim 6 further comprising:
   an electronic detection circuit connected to the sense coils for detecting the polarity change between the signals in the first and second sense coils.

8. The position sensing system of claim 3 further comprising:
   a first capacitor connected between a pair of terminals of the first sense coil and a second capacitor connected between a pair of terminals of the second sense coil thereby establishing for each of the sense coils a closed circuit for the high frequency signal.

9. The position sensing system of claim 8 further comprising:
   an impedance sensing device connected to the VCM coil for measuring the mutual coupling to the first and second sense coils.

10. A method for sensing the precise position of a read/write head in an apparatus having a primary actuator for coarse positioning of the head and a magnetic microactuator for fine positioning of the head, wherein the microactuator includes a voice coil motor (VCM) with a VCM coil, the method comprising steps of:
   a) providing a fixed member attached to the primary actuator and a moveable member attached to the fixed member whereby the moveable member may move in relation to the fixed member in response to current through the VCM coil fastened to the moveable member;
   b) applying a high frequency signal to the VCM coil via a pair of terminals at opposite ends of the VCM coil;
   c) positioning a first sense coil on the fixed member near the VCM coil such that the first sense coil can receive a portion of the high frequency signal transmitted by the VCM coil by mutual magnetic coupling; and
   d) measuring the portion of the high frequency signal coupled into the first sense coil.

11. The method of claim 10 wherein the providing step a) comprises:
   providing a gimbal insert as the fixed member and a slider as the moveable member.

12. The method of claim 10 wherein the positioning step c) further comprises:
   positioning a second sense coil on the fixed member near the VCM coil but on an opposite side of the VCM coil from the first sense coil such that the second sense coil can receive a portion of the high frequency signal transmitted by the VCM coil by mutual magnetic coupling.

13. The method of claim 12 further comprising a step of:
   e) connecting the first sense coil and the second sense coil in series connection to provide an opposite polarity relationship between the coils with regard to the mutually coupled high frequency signal transmitted from the VCM coil.

14. The method of claim 13 further comprising a step of:
   f) detecting a polarity change between the signals in the first and second coils with an electronic detection circuit connected to the first and second sense coils.

15. The method of claim 12 further comprising a step of:
   e) establishing a closed circuit for the high frequency signal sensed by the first and second sense coils with a first capacitor connected across a pair of terminals of the first sense coil and a second capacitor connected across a pair of terminals of the second sense coil.

16. The method of claim 15 further comprising a step of:
   f) measuring the mutual coupling to the first and second sense coils with an impedance sensing device connected to the VCM coil.

17. A position sensing system comprising:
   a primary actuator coupled to a microactuator supporting a transducer; and
   means for sensing a movement of the microactuator relative to the primary actuator utilizing a voice coil motor coil.

18. The position sensing system of claim 17 wherein the position sensing system senses the movement of the microactuator relative to a primary actuator in a head disc assembly of a disc drive.

19. A position sensing system in a head disc assembly of a disc drive comprising:
   a primary actuator coupled to a microactuator supporting a transducer; and
   means for sensing a movement of the microactuator relative to the primary actuator;
   a fixed member attached to the primary actuator;
   a moveable member attached to the fixed member by an attachment device which permits the moveable member to move in relation to the fixed member along a predetermined pathway, wherein a voice coil motor coil of the microactuator is attached to the moveable member;
   a pair of terminals at opposite ends of the voice coil motor coil for receiving a high frequency signal applied to the voice coil motor coil; and
   a sense coil attached to the fixed member and positioned near enough to the voice coil motor coil to receive a measurable portion of the high frequency signal transmitted from the voice coil motor coil through mutual magnetic coupling.

20. The position sensing system of claim 19 further comprising:
   a second sense coil attached to the fixed member on an opposite side of the voice coil motor coil from the first sense coil, the second sense coil receiving another measurable portion of the high frequency signal from the voice coil motor coil through mutual magnetic coupling.

* * * * *